United States Patent [19]

Sweazey

[11] Patent Number: 5,165,024

[45] Date of Patent: Nov. 17, 1992

[54] INFORMATION TRANSFER AND RECEIVING SYSTEM WITH A RING INTERCONNECT ARCHITECTURE USING VOUCHER AND TICKET SIGNALS

[75] Inventor: Paul Sweazey, San Jose, Calif.

[73] Assignee: Apple Computer, Inc., Cupertino, Calif.

[21] Appl. No.: 508,833

[22] Filed: Apr. 12, 1990

[51] Int. Cl.$^5$ .................. G06F 9/312; G06F 13/14; G06F 13/36; G06F 13/42

[52] U.S. Cl. .................. 395/325; 364/229; 364/229.3; 364/229.5; 364/230.6; 364/239; 364/240; 364/240.5; 364/240.8; 364/241.7; 364/241.2; 364/240.9; 364/242.94; 364/242.95; 364/242.5; 364/260

[58] Field of Search ... 364/200 MS File, 900 MS File; 370/60, 80; 395/800, 325, 275, 325, 575, 200, 725

[56] References Cited

U.S. PATENT DOCUMENTS

| | | | |
|---|---|---|---|
| 3,749,845 | 7/1973 | Fraser | 179/15 |
| 4,390,944 | 6/1983 | Quackenbuch | 395/325 |
| 4,430,700 | 2/1984 | Chadime et al. | 395/200 |
| 4,468,734 | 8/1984 | Lanier et al. | 395/575 |
| 4,646,232 | 2/1987 | Chang et al. | 395/325 |
| 4,710,917 | 12/1987 | Tompkins et al. | 370/62 |
| 4,768,145 | 8/1988 | Wheelwright et al. | 364/200 |
| 4,780,870 | 10/1988 | McHarg et al. | 370/60 |
| 4,783,730 | 11/1988 | Fischer | 364/200 |
| 4,814,978 | 3/1989 | Dennis | 364/200 |
| 4,815,071 | 3/1989 | Shimizu | 370/60 |
| 4,835,674 | 5/1989 | Collins et al. | 364/200 |
| 4,837,676 | 6/1989 | Rosman | 364/200 |
| 4,918,644 | 4/1990 | Terada et al. | 395/325 |
| 4,967,344 | 10/1990 | Scavezze et al. | 395/575 |
| 4,979,098 | 12/1990 | Baum et al. | 364/200 |

FOREIGN PATENT DOCUMENTS 2068154A 8/1981 United Kingdom .
2226740A 7/1990 United Kingdom .
WO 8403192 8/1984 World Int. Prop. O. .

Primary Examiner—Thomas C. Lee
Assistant Examiner—Daniel H. Pan
Attorney, Agent, or Firm—Blakely, Sokoloff, Taylor & Zafman

[57] ABSTRACT

A computer system interconnection including a plurality of nodes each such node being associated with at least one of a plurality of computer system components. Transmission apparatus connects each of said nodes to a node which is a source of information and to a node which is a recipient of information. Each of such nodes comprises apparatus for storing information, apparatus for receiving information from and transferring information to the associated one of the system components, and apparatus for placing a voucher signal on the transmission apparatus in response to the receipt of information from the associated one of such components to indicate that the node has information to be transmitted to another system component. Each of such nodes further comprises apparatus responsive to the receipt of a voucher signal for determining whether the node is able to store information in its apparatus for storing information, apparatus responsive to the determination that storage is available for placing a ticket signal to so indicate on the transmission apparatus, and apparatus for transferring information received from the associated system component to the transmission apparatus in response to the receipt of a ticket signal.

12 Claims, 5 Drawing Sheets

INFORMATION TRANSFER AND RECEIVING SYSTEM WITH A RING INTERCONNECT ARCHITECTURE USING VOUCHER AND TICKET SIGNALS

BACKGROUND OF THE INVENTION

1. Field of the Invention:

This invention relates to interconnection circuitry and, more particularly, to methods and apparatus for handling data within a computer system in a manner that a plurality of data sources can transfer information to a plurality of destinations concurrently.

2. History of the Prior Art:

The typical computer system utilizes a busing arrangement as its primary interconnection to transfer information from one component of the system to another. In such a system, a component such as a central processor directs information to another component by placing the address to which the information is directed on the system address bus and the information on the system data bus. The destination for the information recognizes an address within its range of addresses and accepts the information available on the data bus. Each of these buses is made up of a number of conductors (for example, thirty-two) which physically connect to each of the system components. During the time that any particular source of information is utilizing the buses, they are unavailable for use by any other source since all of the conductors of each bus available to carry either address or data information are occupied. Consequently, information may be sent by only one source at a time (although more than one destination may receive information if more than one destination can respond to the same address) since there is no room for information from more than one source at a time on the data or address buses.

Typically, a bus arrangement has sufficed for transferring information in the typical personal computer or work station. However, the requirements for pathways to handle more and more information faster have increased to the point that various functions cannot be performed by the typical busing arrangement. Functions such as the presentation of animated graphics and television require the transfer of so much information that they tend to require that the entire system be devoted to their use. When it is desired to incorporate a number of these functions into the same computer system and to run more than one of these operations at the same time, a busing arrangement is incapable of handling the load.

SUMMARY OF THE INVENTION

It is, therefore, an object of the present invention to increase the load handling abilities of a computer system.

It is another, more specific object, of the present invention to provide a secondary interconnection arrangement for a computer system.

It is an additional object of the present invention to provide a secondary interconnection arrangement for a computer system capable of handling concurrently information from a plurality of sources directed to a plurality of destinations.

These and other objects of the present invention are realized in a computer system interconnection comprising a plurality of nodes each such node being associated with at least one of a plurality of computer system components; transmission apparatus connecting each of said nodes to a node which is a source of information and to a node which is a recipient of information; each of such nodes comprising apparatus for storing information, apparatus for receiving information from and transferring information to the associated one of the system components, apparatus for placing a voucher signal on the transmission means in response to the receipt of information from the associated one of such components to indicate that the node has information to be transmitted to another system component, apparatus responsive to the receipt of a voucher signal for determining whether the node is able to store information in its apparatus for storing information, apparatus responsive to the determination that storage is available for placing a ticket signal to so indicate on the transmission apparatus, and apparatus for transferring information received from the associated system component to the transmission means in response to the receipt of a ticket signal.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
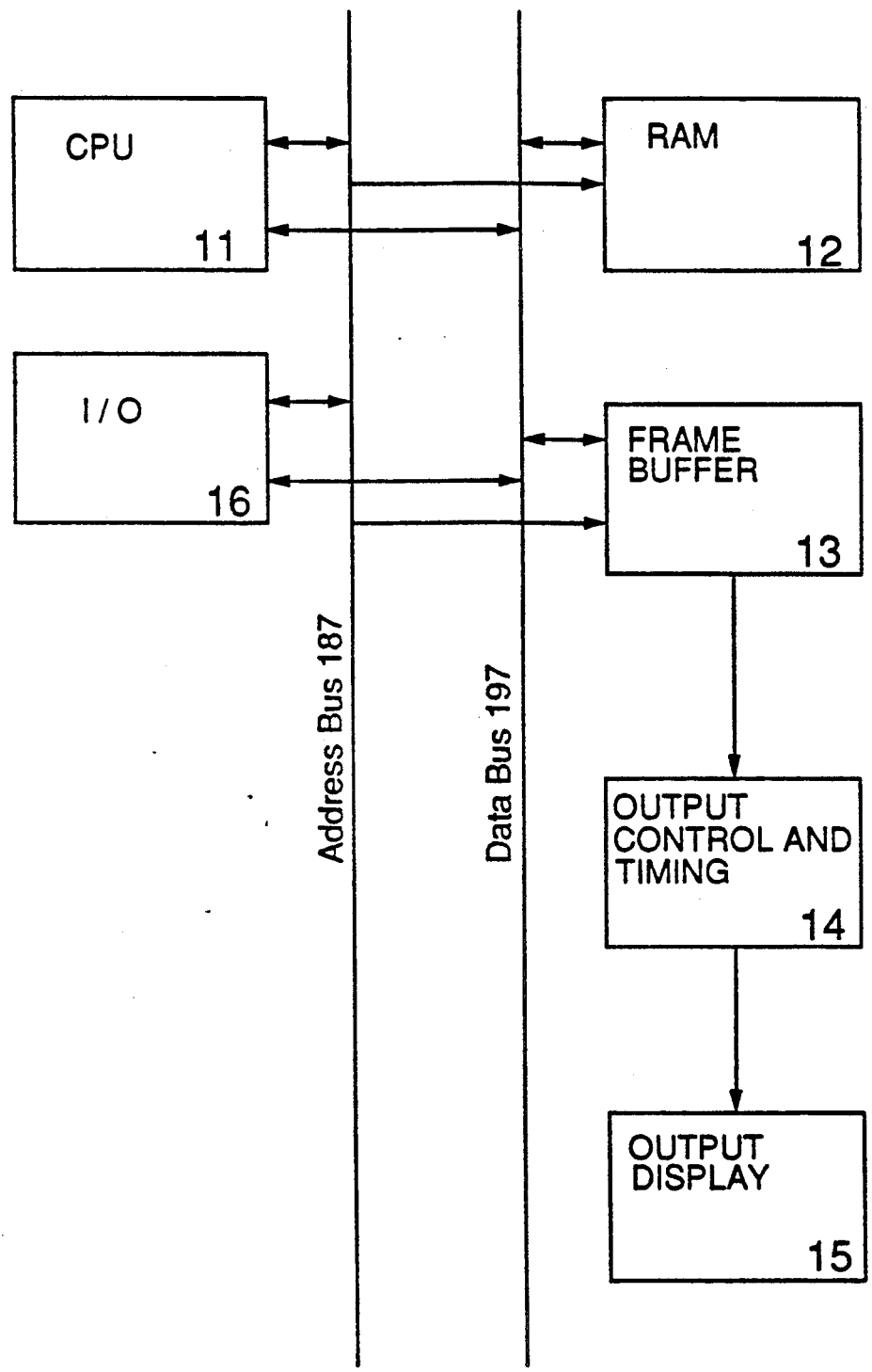
FIG. 1 is a block diagram of a typical prior art computer system.

Referring now to FIG. 1 there is illustrated a block diagram which sets forth in general detail the components of a typical computer system constructed in accordance with the prior art. The system 10 includes a central processing unit 11, random access memory 12, a frame buffer memory 13, output control and timing circuitry 14, an output display 15, and input/output circuitry 16. In general, each of the main components such as the central processing unit 11, the random access memory 12, the frame buffer memory 13, and the input/output circuitry 16 are joined together by connection to a system bus which may include an address bus 18 and a data bus 19. Each of the address bus 18 and the data bus 19 include a plurality of conductors each connecting all of the components on the bus in parallel.

A component such as the central processing unit 11 directs data to another component by placing the address to which the data is directed on the system address bus 18 and the data on the system data bus 19. An address may be represented by thirty-two bits of binary coded information all of which are represented by two state signals placed on the conductors of the address bus 18. In like manner, the data on the data bus 19 is represented by binary coded two state signals placed on the conductors of the data bus 19. Both the address and the data along with their control signals typically take most if not all of the conductors of the address and data buses. The destination for the data recognizes an address on the address bus 18 within its range of addresses and accepts the data available on the data bus 19. Since each of the address and data buses is made up of a number of conductors which physically connect to each of the system components on the bus and all of the conductors of each bus carry the information that is being directed to one address, during the time that any particular source of information is utilizing the buses, the buses are unavailable for use by any other source. Consequently, data may be sent by only one source at a time (although more than one destination may receive data if more than one destination can respond to the same address) since there is no room for information from more than one source at a time on the data or address buses.

In order to overcome the limits of a bus system, it seems apparent that more than one interconnection between system components is necessary. The ultimate arrangement would be one in which each component were connected to each other component. This, however, appears to require a great deal of control circuitry and a very large number of conductors which would probably be used substantially less than full time. As a compromise between the single system bus and the direct connection of all components, various ring arrangements have been suggested. In such an arrangement, each component is directly connected by one-way connection paths to receive information from one single other system component and to send information to another single system component. Thus, all components which would normally be connected to a bus are connected to only two other components in a unidirectional ring. Each component then forwards information around the ring until the information arrives at its destination. Separating the interconnection into individual paths between components isolates the components from all but two other components but increases the amount of traffic which can be handled by the ring over the amount which may be placed on a system bus because a number of sources of information can communicate with a number of destinations at the same time. This occurs because the isolation allows one system component to send information to a second while a third component sends information to a fourth component.

Ring-type systems suggested to date have been ones in which a particular component places a packet of information on the ring addressed to a particular other component. The packet is forwarded to the addressed component and, if that component cannot handle the incoming information, it places a retry command on the ring, causes the operation to be terminated, the transmitted information to be dumped, and the packet to be resent after some delay. The retry operation inherently slows the system when the amount of traffic on the system approaches saturation. In fact, as the amount of information placed on the ring increases in retry systems, the ability to handle that information decreases because the system thrashes as the number of retries increases. In fact, such retry systems typically are able to handle from one-third to one-half of theoretically attainable loads.

The present invention relates to a ring type system based on a different principle in which the amount of information transferred increases as the amount of traffic within the system increases. This ring-type system breaks information to be sent into packets each of a preselected size. A reservation voucher is generated for each packet of information which is to be sent. The voucher is placed on the ring interconnect by the source component addressed to the destination component while the packet of information remains at the source component. The voucher is forwarded by the various components which are unaddressed nodes on the ring interconnect until it reaches the addressed component.

If the destination component can accept the packet of data, space for the packet is reserved at the destination component; and a ticket signal is placed on the ring interconnect addressed to the source component. If the destination component cannot accept the packet, the voucher is stored in a queue at the destination until the destination component is able to handle the packet. When the destination component is able to handle the packet, a ticket signal is placed on the ring interconnect addressed to the source component. When the ticket signal is received by the source component, the packet is released onto the ring interconnect. The packet is forwarded by the various components which are unaddressed nodes on the ring interconnect until it reaches the addressed component. When the packet of information arrives at the destination component, space is available and the information is stored in that space for utilization.

Using this system, information is never placed on the ring interconnect until space is available. Consequently, a retry is not necessary and information need not fill the interconnect to interfere with other information only to be dumped when a destination component is busy. Retry delays are not a factor in the system. This substantially reduces the loss of system bandwidth caused by the retry method and allows the system to function much more efficiently than retry systems when approaching saturation.

Such a system will operate most efficiently if the flow of voucher and ticket symbols is not impeded by the flow of information being transferred over the interconnect. If they are impeded, large latencies are introduced between the time that a node determines that it needs to send a packet and the time that it is allowed to actually send it. This delay is the time from launch of a voucher until receipt of a corresponding ticket. When the ring is in use, this latency can become very long, because there may be large quantities of data ahead of the voucher or ticket on the ring. However, by associating first priority to vouchers and tickets, they can "jump over" packets of data that are queued in a node awaiting forwarding to their destination node. The present invention effects this beneficial result by providing apparatus for assuring that voucher and ticket symbols are transmitted in favor of information by each node on the ring. This greatly enhances the speed of operation of the arrangement.

Figure 2:
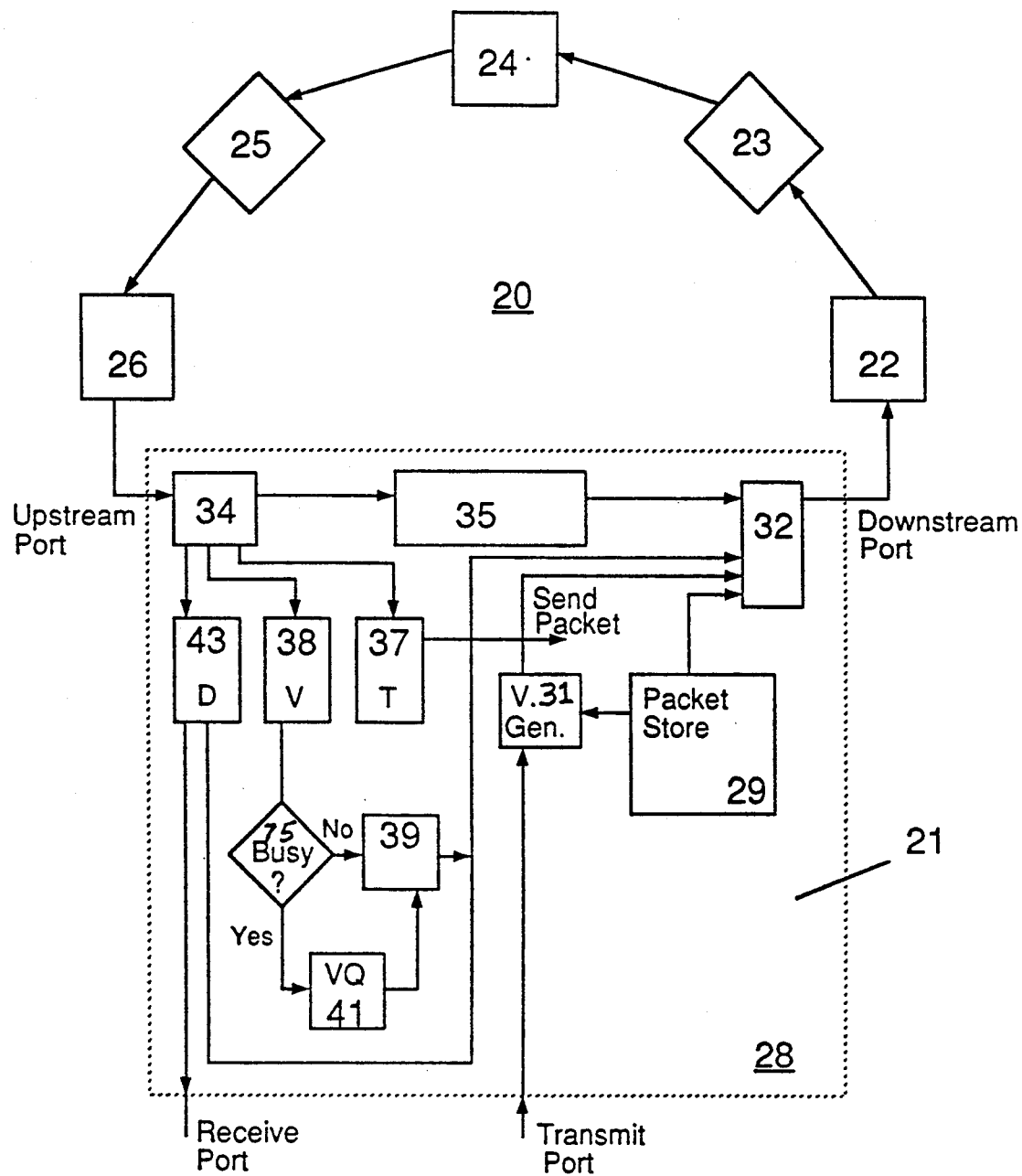
FIG. 2 is a block diagram of an interconnect for a computer system constructed in accordance with the invention.

FIG. 2 is a logical block diagram of a computer system constructed in accordance with the invention. In FIG. 2, a ring interconnection arrangement 20 is illustrated. The arrangement 20 shown in the figure has six individual nodes 21-26 each of which may be associated with or a part of one of the components (e.g., central processing unit, random access memory) of a computer system such as that illustrated in FIG. 1. Each of the components includes node circuitry 28 which includes all of the circuitry for accomplishing the generation of vouchers and tickets and for placing packets of data on the ring interconnect. Node circuitry 28 includes an upstream port for receiving information from the ring interconnect, a downstream port for placing information on the ring interconnect, a transmit port through which information from the component is transferred, and a receive port through which information to the component is transferred. When the component at node 21 desires to transfer information to another component on the ring interconnect, the information is sent through the transmit port and stored in packet-sized amounts in a packet store circuitry 29. This storage causes voucher generation circuitry 31 to generate a voucher signal and place that signal on the ring interconnect through a downstream router circuit 32. The voucher signal includes an identifier for the source component, an identifier for the destination component, and an indication that the signal is a voucher.

Each node circuit 28 also includes an upstream router circuit 34 for comparing the identifier of any information received at the upstream port to determine where the information should be directed. If information is not addressed to the particular destination node, it is transferred to a circuit 35 for forwarding around the ring interconnect. The circuit 35 includes circuity such as first-in first-out storage circuitry for queueing up any information which occurs on the ring interconnect while information is being put on the ring interconnect by that component. This storage circuitry allows a node to respond to conduct a transfer of data while still receiving information from upstream circuitry and thereby avoid interference between information from different source nodes. Those skilled in the art will understand that the size of the storage circuitry must be such as to account for the amount of traffic to be expected on the ring interconnect. The circuit 35 may also include circuitry for transferring voucher and ticket signals on a priority basis.

A circuit 37 responds to tickets addressed to the node to release the packet of data stored in the packet store memory 29 so that it may be sent to the ring interconnect by the downstream router 32. A circuit 38 responds to voucher signals from other nodes addressed to the particular node 28 to determine whether the node 28 is capable of receiving data at that time. If the node 28 has space to receive the data, a ticket generator circuit 39 generates a ticket signal which is placed on the ring interconnect by the downstream router; and storage is reserved in a data receipt and storage area 43 for the data to be received. If the node 28 has insufficient storage for the packet of data, the voucher signal is placed in a voucher queue 41 where it remains until sufficient storage is available for its associated packet of data. The voucher signal then causes the ticket generator circuit 40 to generate and place on the ring interconnect a ticket and causes space to be reserved in the storage area 43. Finally, data receipt and storage circuitry 43 receive data packets addressed to the node 28 for transfer to the component through the receiving port.

In operation, when a component such as the component at node 21 desires to transfer data, the data is stored in the packet storage area 29; and a voucher is generated by the voucher generator 31 and placed on the ring interconnect by the downstream router 32. The data remains in the packet storage area 29. The voucher proceeds around the ring interconnect being checked at each node 28 to determine whether that node holds a range of addresses including the destination address. The voucher signal is forwarded by the circuitry 35 of each node until it reaches a node 28 having the correct address. The upstream router circuitry 34 transfers the voucher signal to voucher receipt circuitry 38 which tests whether the node is busy 75 and, if not, causes the ticket generator 39 to generate a ticket and space to be reserved for the data packet in storage area 43. If the component is busy 75, the voucher is placed in the voucher queue 41 until all vouchers therein have been cleared. At that time, the ticket generator 39 is caused to generate a ticket and space is reserved for the data packet.

The ticket is placed on the ring interconnect and is passed through the various nodes until it returns to the node associated with the source component. At the source node, the upstream router circuit 34 indicates to the ticket circuit 37 that a ticket has been returned. The circuit 37 responds by sending the information stored in the packet store memory circuitry 29 onto the ring interconnect. This information proceeds as did the voucher until it arrives at the destination node. Here the information is taken from the ring interconnect and sent to the data receipt and storage circuitry 43 from which it is transferred to the receive port of the particular component for use.

It will be obvious to those skilled in the art that the invention described herein is capable of allowing transmissions of information to be carried on concurrently between a plurality of sources and a plurality of destinations. For example, information may be transferred from node 21 to node 22 while information is being transferred from node 23 to node 24. This greatly increases the amount of traffic which can be handled by the system. Moreover, the system does not burden the ring interconnect with failed information packets as do prior art arrangements which include retry systems and therefore does not tend to thrash as it handles more information.

In order to cause the logical arrangement described in FIG. 2 to function efficiently, it is useful to assure that certain signals trasversing the ring interconnect are not delayed. More particularly, it is desirable that the voucher and ticket signals which cause the operation of data signal transmission to occur traverse the ring interconnect without being slowed by packets of data. In this manner, the system may be made to operate efficiently in transferring information.

Figure 3:
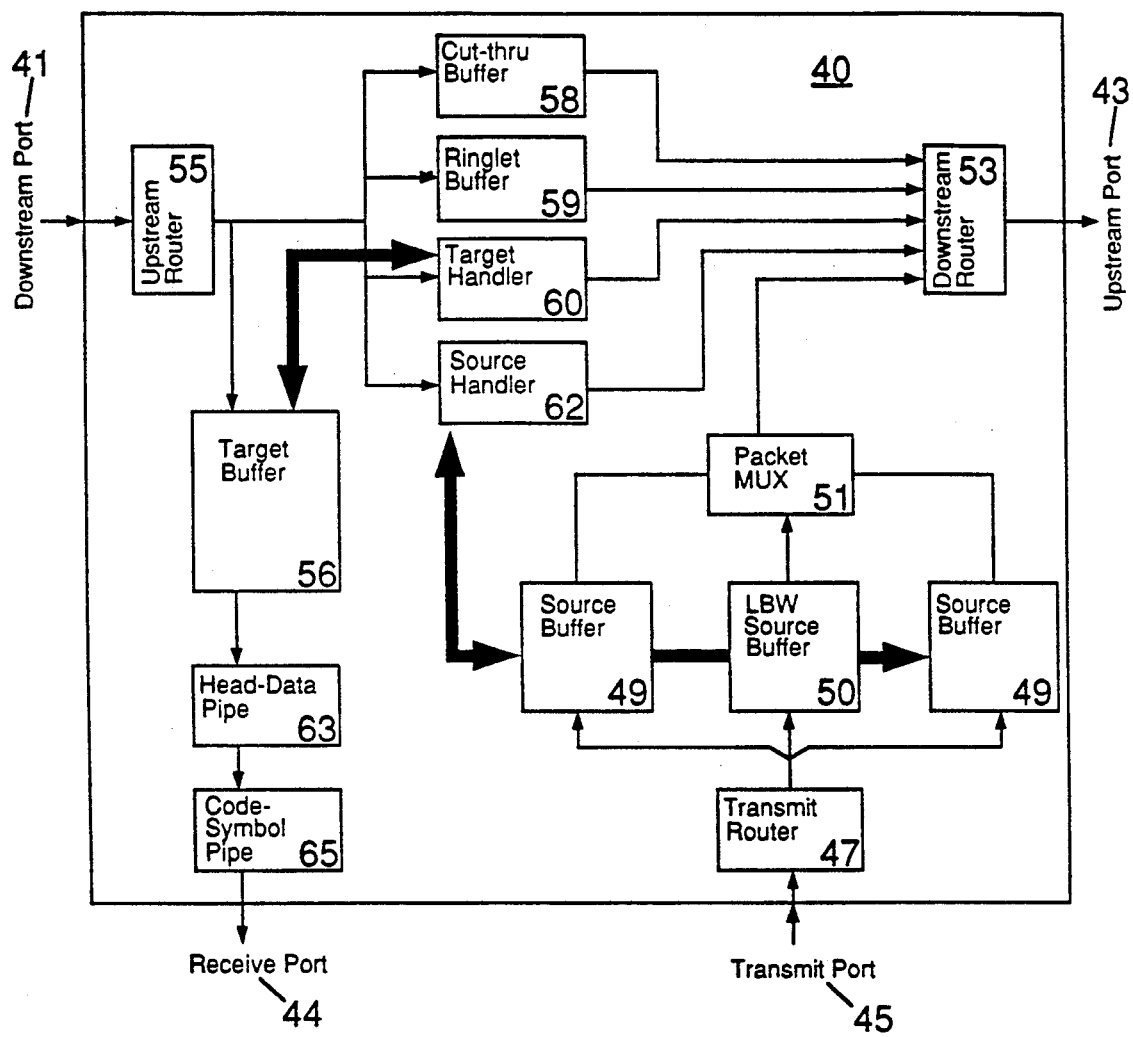
FIG. 3 is a more detailed block diagram of a portion of computer system illustrated in FIG. 2.
Figure 4A:
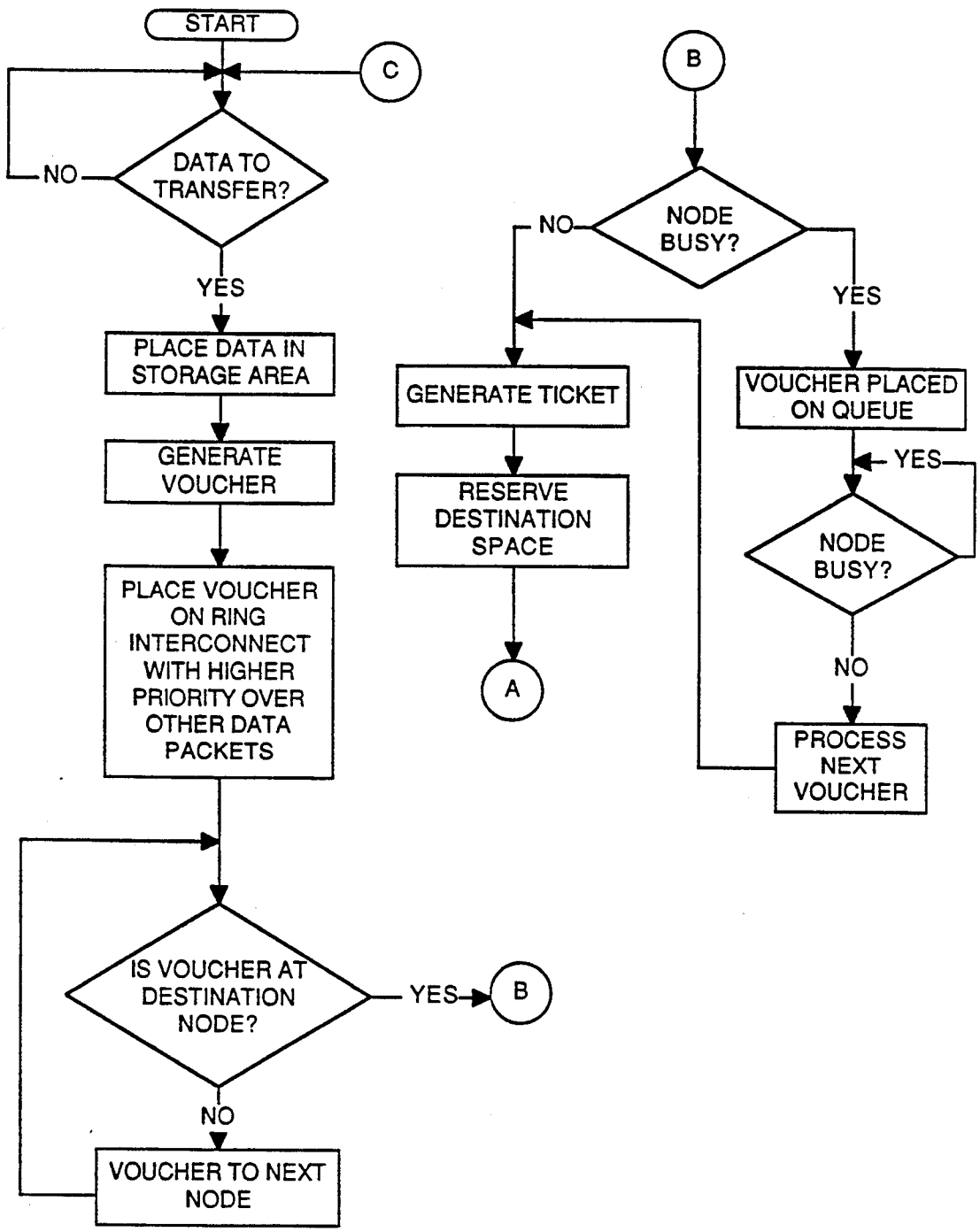
FIGS. 4A and 4B illustrate an overview flow chart of operational aspects of the present invention.
Figure 4B:
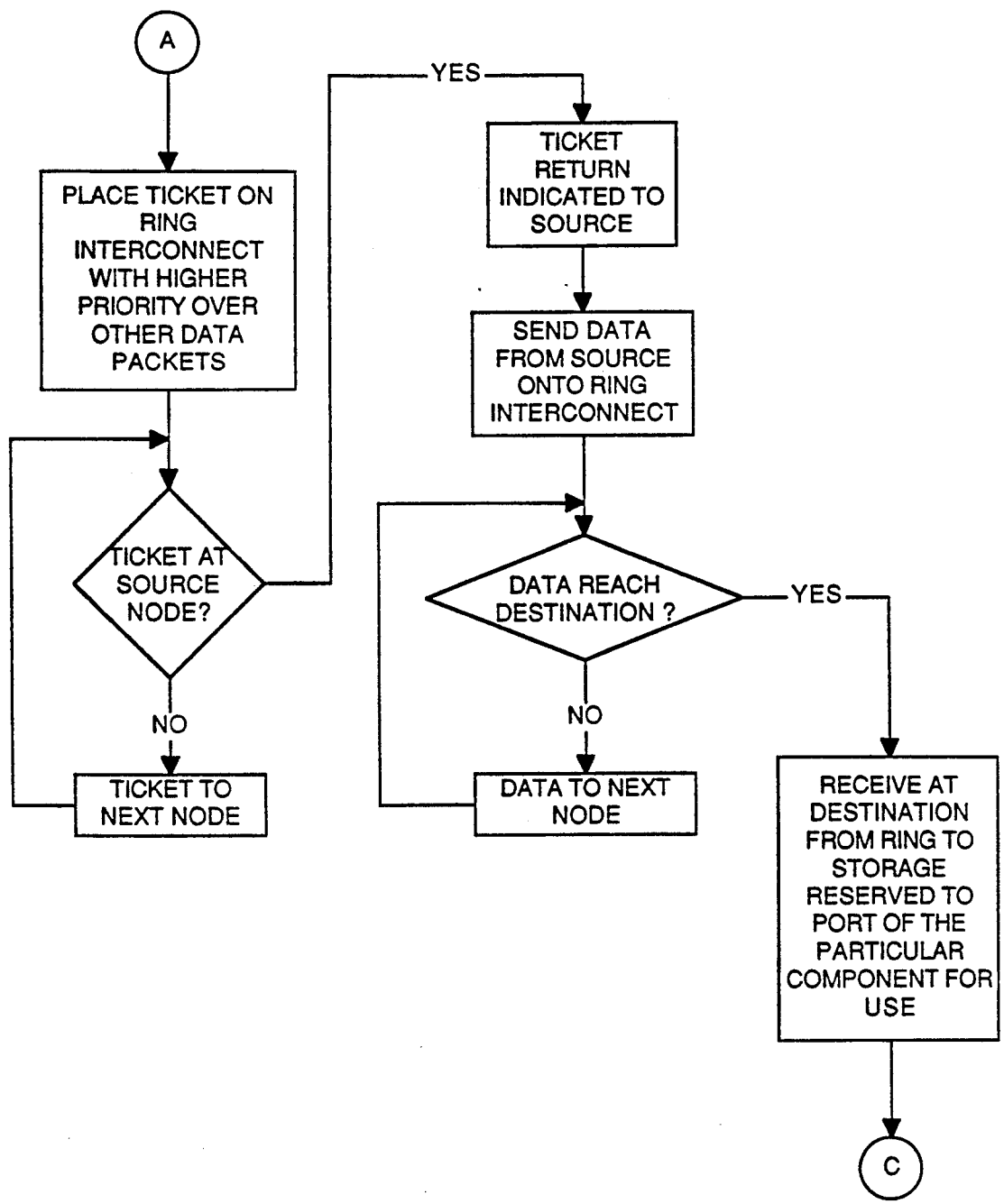

FIG. 3 illustrates in more detail an individual node 40 of the invention. Each node 40 includes an upstream port 42 connected to receive information and a downstream port 43 connected to transmit information in a ring interconnect arrangement. Each node 40 also includes a receive port 44 through which information is tranferred to the associated component of the computer system and a transmit port 45 through which information is transferred from the associated component of the computer system. In this description, the following definitions are used. A symbol is any quantity of data that can be transferred on a parallel data path during one phase of a clock cycle. A stream is a logically-contiguous sequence of data symbols of arbitrary length. A packet is a portion of a stream having a fixed limit consisting of one head symbol, data symbols, and one tail symbol.

Typically, the ring interconnect arrangement illustrated in FIG. 3 is a secondary interconnection and the individual components of the computer system are components which are joined in a primary busing arrangement such as the NuBus manufactured and used by Apple Computer, Inc., in its line of Apple Macintosh II personal computers. In such an arrangement, each of the components is connected to the ring interconnect arrangement by an individual connector including a plurality of conductors which join the downstream port of one node to the upstream port of the next node in the ring interconnect arrangement. Typically, a stream of information enters the node through the transmit port 45 from the component associated with the node and is transferred to the ring interconnect through the downstream port 43. Information directed on the ring interconnect to a node arrives at the upstream port of a target node 40 and is transferred to the component via the receive port 44.

The transmit port 45 of each node 40 is connected to a transmit router 47. The transmit router 47 is responsible for controlling the flow of streams through the transmit port 45 and for sending those streams of information to one of a plurality of source buffers 49. Each source buffer 49 functions to hold one of a number of multiple source streams and to hold that stream until it can be sent through the downstream port 43. A low bandwidth source buffer 50 is also provided and is adapted to hold information requiring very few clock cycles from a number of streams simultaneously so that they won't interfere with larger streams of information. A packet multiplexor 51 determines which source buffer should be emptied next, and forwards the chosen stream of information to a downstream router 53. The downstream router 53 chooses between many possible sources of information by selecting them according to a defined priority to assure the forward progress of the most important information. The downstream router 53 controls the transfer of information onto the ring interconnect through the downstream port 43.

An upstream router 55 is arranged to receive information arriving at the upstream port 42. The upstream router 55 decodes the information and determines if it is addressed to that node 40. A target buffer 56 is connected to receive information from the upstream router 55 which is directed to that particular node 40. A cut-through buffer 58 is a temporary repository of access symbols not addressed to the particular node 40. A ring buffer 59 is a large capacity first-in first-out circuit that passes packets of data from the upstream portion of the ring interconnect that are destined for another downstream node. A target handler 60 receives the access symbols called tickets whose purpose is to acknowledge that space has been reserved in a target buffer for a forthcoming stream of data. A source handler 62 sends voucher access symbols to the downstream router 53 in order to reserve space for a stream of information in the target buffer 56 of a target node. When space has been reserved in the target node, the source handler 62 is informed by receipt of a ticket symbol from the upstream router 55.

A head-data pipeline 63 introduces a delay into the flow of packet symbols following the head of a packet of information to provide a warning to the associated component at the node 40 that a particular stream of data is about to arrive. A code symbol pipeline 65 provides a similar warning at the receive port 44 so that the component may know beforehand when a head, data packet, or don't care symbol is about to arrive.

The operation of the circuitry at the node 40 will now be described. Each symbol used with the ring interconnect includes the identifier of its source node, the identifier of its target node, the stream with which it is associated, and an indication of the type of signal. Thus, a voucher symbol indicates its source, its target, its stream, and that it is a voucher. It should be noted that in addition to the special voucher and ticket access symbols, the first symbol in a packet of information is indicated as a head-of-packet and the last is indicated as a tail-of-packet symbol.

The transmit router 47 controls the flow of symbol streams into the source buffers 49. The transmit router 47 receives the symbol stream from the transmit port 45, determines which of the source buffers 49 is entitled to receive the stream, and forwards the stream to the selected source buffer 49. The transmit router 47 sorts the incoming symbols by stream number and collects those symbols together so that all symbols pertaining to one stream are placed in one source buffer 49. The transmit router 47 also signals the associated component to cease transmitting when no space is available for another symbol. Whenever the transmit router 47 receives another head symbol from the transmit port 45, it sends the head symbol to all of the source buffers 49. A source buffer 49 may respond with a signal indicating empty or, match, or not respond at all. If the source buffer 49 responds with a match, then that source buffer 49 receives all of the additional data symbols until it is full or the next head symbol appears. Only one match is possible so all information regarding any one stream is placed in one source buffer.

If no match signal is received and any empty signal is received, the transmit router 47 may select that source buffer 49 to receive the data symbols from that stream. The transmit router 47 selects a source buffer 49 and sends a selected signal to that source buffer. If no match or empty signal is detected, the transmit router 47 removes a transmit enable signal from the transmit port 45 and continues to send the first data symbol until at least one source buffer 49 returns an empty signal.

There is a bit within each head symbol that arrives at the transmit port 45 to indicate whether that stream should be handled by the low bandwidth source buffer 50. It is the responsibility of the component that generates the streams to choose whether the stream should be so routed. If a stream is destined for the low bandwidth source buffer 50, then all other match and empty signals are ignored. The low bandwidth source buffer 50 may send a full signal to indicate that it is not ready to accept data and cause the transmit port 45 to cease transmitting symbols.

The function of a source buffer 49 is to place symbol streams in packets before transmission around the ring interconnect to maximize the efficiency of the transfer by maximizing the ratio of data symbols to access symbols while limiting packet size to limit transmission delay. Each source buffer 49 contains a head register, a comparator to compare the contents of the head register with the target and stream fields of the arriving head symbol, a first-in first-out circuit to hold the data symbols, and a counter to detect if the maximum length packet has been sent to the packet multiplexor 51. When the transmit router 47 issues a head symbol, each source buffer 49 receives it and compares the source, target, and stream fields to the value currently in the internal head register. If the first-in first-out circuit is not empty and the fields match, a match signal is returned to the transmit router 47. If the first-in first-out circuit is empty, an empty signal is returned.

As soon as a source buffer 49 has a head symbol and one data symbol, it sends signals indicating the target node and the stream to the source handler 62. The source handler 62 responds after some delay by sending a launch signal to the source buffer 49 giving it permission to send the packet of data collected within its first-in first-out circuit. The source buffer 49 sends a start signal to the packet multiplexor 51 which eventually responds by enabling the output of the source buffer 49. As each symbol is sent from the source buffer 49, the packet count register is incremented; and the transmission is terminated when the first-in first-out circuit is empty or the count reaches a predetermined maximum.

The packet multiplexor 51 selects among the source buffers 49 that have permission to transmit a packet and selects one. Once selected the packet multiplexor 51 transmits the information until terminated by the source buffer 49. Each packet regardless of its source is transmitted to the downstream router 53. The downstream router 53 selects between numerous sources and routes their symbol streams to the downstream port 43. The highest priority symbols are those from the cut-through buffer 58 and nothing can inhibit the transfer of these symbols from propagation through the downstream port 43. The cut-through buffer 58 stores forwarded access symbols (vouchers and tickets), accounting for phase differences between the upstream router 55 and the downstream router 53. Access symbols not addressed to this node pass through the cut-through buffer 58 thereby assuring maximum propagation speed for such symbols around the ring interconnect. The next highest priority source of symbols is the target handler 60 whose primary function is to return ticket access symbols from this node in response to received voucher access symbols. The next priority level is used by the source handler 62 which normally sends the voucher access symbols generated at this node to the downstream router 53. All of these are sources of access symbols which must propagate around the ring interconnect with greater priority than any packet symbols.

If there are no access symbols awaiting transmission, then packet symbols may be forwarded from the ring buffer 59 or from the packet multiplexor 51. The ring buffer 59 is the temporary repository of packet symbols that are to be forwarded to other nodes. It may be organized as a first-in first-out circuit whose capacity is sufficient to absorb whatever upstream traffic may arrive while the downstream router 53 is selecting and transmitting symbols from other sources. If the amount of traffic becomes too large for ring buffer 59 to handle, it sends an urgent signal to the downstream router 53 to assure that its packets of data are handled first. If neither the ring buffer 59 nor the packet multiplexor 51 is in the process of transmitting a packet, then the head symbol of the first to request transmission of a head symbol is selected for transmission to the downstream port 43. If a packet is being sent by one or the other of the packet sources, the other cannot transmit. If a head symbol appears at the ring buffer 59 or the packet multiplexor 51 during transmission of a packet, then it is next selected (after any access symbols) upon termination of the current packet.

The upstream router 55 receives and interprets the symbol stream as it arrives at the upstream port 42. It distinguishes between the access symbols and packet symbols, decodes addresses, and routes each symbol to the appropriate block within the node. The upstream port 42 cannot stop the flow of information so there must always be a block ready to receive that information. The cut-through buffer 58, the target handler 60, and the source handler 62 receive access symbols while the ring buffer 59 and the target buffer 56 receive the packet symbols. The cut-through buffer 58 and the ring buffer 59 handle symbols which are forwarded through the node while the target handler 60, the source handler 62, and the target buffer 56 handle symbols intended for this node.

If a symbol is a voucher and addressed to this node, the symbol goes to the target handler 60. If the symbol is a ticket addressed to this node, the symbol goes to the source handler 62. If the symbol is another access symbol, then it is directed to the cut-through buffer 58. If the symbol is a head symbol addressed to this node, it is directed to the target buffer 56. If the symbol is associated with a matching head symbol (i.e., the following packet of information), it is directed to the target buffer 56. Any other packet symbol is directed to the ring buffer 59.

The source handler 62 manages permission for a new packet to be launched onto the ring interconnect. It does so by causing storage space to be reserved in the target buffer 56 of the target node. This is done by transmitting a voucher symbol and receiving a ticket symbol. When a source buffer 49 sends the target node identifier and the stream number to the source handler 62, the source handler 62 responds by forming a voucher using this information and sending the voucher symbol to the downstream router 53. It then awaits the return of a ticket symbol for the stream. During this period, it may send additional vouchers for other source buffers 49 so that multiple vouchers may be outstanding. When a ticket arrives, the source buffer 49 compares the target field and the stream values with the values contained in the outstanding vouchers and launches the packet whose field matches the incoming ticket.

The target handler 60 monitors the state of the target buffer 56 and the arrival of vouchers that request space in the target buffer 56. The target handler 60 issues tickets to guarantee that the target buffer 56 will not overflow. If the number of vouchers requesting space in target buffer 56 exceeds the space available, the additional vouchers are stored in a target voucher queue organized as a first-in first-out circuit. The target handler 60 includes a counter that is initialized to the maximum number of packets that can be stored in the target buffer 56 at once. Each time the target handler 60 issues a ticket, the counter is decremented. Each time the target buffer 56 sends a tail-received signal to the target handler 60, the counter is incremented. If the counter goes to zero, the voucher is placed in the voucher queue and no ticket is issued. If the target queue is not empty, each time a tail-received signal arrives a voucher is removed form the first-in first-out circuit and a ticket generated from it. If a voucher arrives when the first-in first-out circuit is empty and the counter value is greater than zero, then a ticket is derived from the voucher and sent immediately to the downstream router 53.

Thus, the arrangement of FIG. 3 provides that a stream of information from transmit port 45 is directed to a source buffer 49. The source buffer communicates this to the source handler 62 which generates a voucher symbol carrying the target and source identifiers. This voucher symbol is sent to the downstream router 53. The downstream router 53 selects among the available symbols and transmits first the access symbols directed to other target nodes residing in the cut-through buffer 58, then the other access symbols, and finally packets of information from the ring buffer 59 or the packet multiplexor 51. Ultimately, the voucher is placed on the ring interconnect before any packet symbols and traverses to the target node where it is routed by the upstream router to the target handler 60. The target handler 60 recognized the signal and generates a ticket symbol while reserving space in the target buffer 56 for the packet to be sent. The ticket symbol is ultimately placed on the ring interconnect by the downstream router 53 of the target node and sent to the source node. At the source node, the ticket symbol is transferred by the upstream router to the source handler 62. The source handler 62 compares the target field and the stream values with the values contained in the outstanding vouchers and launches the packet whose field matches the incoming ticket. The packet is ultimately placed on the ring interconnected by the downstream router 53 and travels to the target node where it is placed in the target buffer. From the target buffer, the packet is routed through the head-data pipe 63 and the code-symbol pipe 65 to the associated component.

It will be recognized by those skilled in the art that the arrangement of the present invention provides concurrent transfer of information between a number of system components while assuring that the signals upon which the transfer of the data signals depend are forwarded on a priority basis to efficiently accomplish their purposes without interference by information signals.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer system interconnection apparatus having a first node associated with a first system component, a second node associated with a second system component, and transmission means interconnecting the first and second nodes, and for transferring information from the first system component to the second system component, comprising:

in the first node
(a) receiving means coupled to the first system component for receiving from the first system component an outgoing information which is destined for the second system component of the second node;
(b) first storage means coupled to the receiving means for storing the outgoing information before transmitting the outgoing information;
(c) voucher generation means coupled to the first storage means and the transmission means for generating a voucher signal destined for the second node in response to the receipt of the outgoing information in the first storage means to indicate that the first node has information to be transmitted to the second system component of the second node and for placing the voucher signal on the transmission means, wherein the voucher generation means also receives a ticket signal from the transmission means;
(d) means coupled to the first storage means and the transmission means for transferring the outgoing information from the first storage means onto the transmission means, wherein the means for transferring transfers the outgoing information to the transmission means only when the voucher generation means receives the ticket signal;

in the second node
(e) second storage means coupled to the transmission means for receiving and storing the outgoing information from the transmission means, wherein the outgoing information is stored in the second storage means before the outgoing information is transmitted to the second system component;
(f) voucher receiving means coupled to the transmission means and the second storage means for receiving the voucher signal from the transmission means and for checking the second storage means to determine whether the second storage means is able to store the outgoing information, wherein the voucher receiving means checks the second storage means in response to the receipt of the voucher signal, wherein the voucher receiving means receives the voucher signal prior to the receipt of the outgoing information by the second storage means;
(g) ticket generation means coupled to the voucher receiving means and to the transmission means for generating and placing the ticket signal on the transmission means to the first node to indicate that the second storage means is able to store the outgoing information to be transmitted from the first node when the voucher receiving means determines that the second storage means is able to store the outgoing information, and for reserving adequate space in the second storage means for the outgoing information;

(h) voucher queue means coupled to the voucher receiving means for storing the voucher signal if the voucher receiving means determines that the second storage means is not able to store the outgoing information, wherein the ticket generation means does not generate the ticket signal when the voucher receiving means determines that the second storage means is not able to store the outgoing information, wherein the voucher queue means stores the voucher signal until the second storage means later becomes available to store the outgoing information;

(i) means coupled to the ticket generation means and the voucher queue means for activating the ticket generation means when the second storage means later becomes available to store the outgoing information to generate and place the ticket signal onto the transmission means, wherein the means for activating acts upon the voucher signal stored in the voucher queue means; and (k) transmitting means coupled to the second storage means and the second system component for transferring the outgoing information received and stored in the second storage means to the second system component, wherein when the receiving means of the first node receives the outgoing information, the outgoing information is first stored in the first storage means and the voucher generation means generates and places the voucher signal onto the transmission means, wherein when the voucher receiving means of the second node receives the voucher signal, the voucher receiving means checks the second storage means to determine whether space is available in the second storage means to store the outgoing information, wherein if space is available in the second storage means, the ticket generation means generates and places the ticket signal onto the transmission means, wherein when the voucher generation means receives the ticket signal, the voucher generation means causes the means for transferring to transfer the outgoing information onto the transmission means, wherein when space in the second storage means is not available, the ticket generation means does not generate the ticket signal and the voucher signal is stored in the voucher queue means until space in the second storage means later becomes available for the outgoing information at which time the means for activating activates the ticket generation means to generate and place the ticket signal onto the transmission means.

2. The computer system interconnection apparatus as claimed in claim 1, wherein the voucher queue means comprises a first-in-first-out circuit for storing the voucher signal.

3. The computer system interconnection apparatus as claimed in claim 1, wherein the interconnection apparatus further includes a plurality of nodes, including the first node and the second node, interconnected by the transmission means such that each of the nodes is coupled to an upstream node and a downstream node via the transmission means.

4. The computer system interconnection apparatus as claimed in claim 3, further comprising relay means in each of the nodes for relaying between the transmission means any incoming information directed from its upstream node to its downstream node.

5. The computer system interconnection apparatus as claimed in claim 4, wherein the relay means relays and transmits the voucher signal and the ticket signal prior to the relaying and transmission of any information.

6. The computer system interconnection apparatus as claimed in claim 3, wherein prior to the receipt of the ticket signal from the transmission means, the voucher generation means generates and places additional voucher signals onto the transmission means when the first storage means receives additional outgoing information destined for others of the nodes from the first system component.

7. The computer system interconnection apparatus as claimed in claim 1, wherein the first storage means stores a selected amount of information from the first system component, wherein the receiving means further comprises means for signaling to the first system component when the first storage means is full and causing the first system component to cease sending information to the first node until the first storage means is available to store more information.

8. In a computer interconnection system having a first node associated with a first system component, a second node associated with a second system component, and transmission means interconnecting the first and second nodes, a method of transferring information between the first and second system components comprising the steps of:

(a) receiving in the first node an outgoing information destined for the second system component of the second node from the first system component;

(b) storing the outgoing information in a first storage means in the first node before transmitting the outgoing information;

(c) generating in the first node a voucher signal destined for the second node in response to the receipt of the outgoing information to indicate that the first node has information to be transmitted to the second system component of the second node and placing the voucher signal onto the transmission means;

(d) receiving the voucher signal in the second node from the transmission means and determining if the voucher signal is destined for the second node;

(e) checking a second storage means in the second node to determine whether the second storage means is able to store the outgoing information if the voucher signal is determined to be destined for the second node;

(f) if the second storage means is determined to be able to store the outgoing information, then generating and placing a ticket signal onto the transmission means to indicate to the first node that the second storage means is able to store the outgoing information and reserving adequate space in the second storage means for the outgoing information;

(g) if the second storage means is determined not to be able to store the outgoing information, then storing the voucher signal in a voucher queue until the second storage means later becomes available to store the outgoing information, wherein the ticket signal is not generated if the second storage means is determined not to be able to store the outgoing information;

(h) activating the step (f) when the second storage means later becomes available to store the outgoing information;

(i) transferring the outgoing information to the second node via the transmission means in response to the receipt of the ticket signal in the first node, wherein the outgoing information is transferred to the second node only after the first node receives the ticket signal; and (j) receiving the outgoing information from the transmission means into the second storage means of the second node and transmitting the outgoing information to the second system component, wherein the outgoing information is stored in the second storage means before being transmitted to the second system component.

9. The method of claim 8, wherein the voucher queue in the step (g) comprises a first-in-first-out circuit.

10. The method of claim 8, wherein the step (d) further comprises the step of relaying any information and signals received from the transmission means if they are determined not to be destined to the second node back to the transmission means.

11. The method of claim 10, wherein the step of relaying further comprising the step of relaying and transmitting any voucher signal and ticket signal prior to the relaying and transmission of any information.

12. The method of claim 8, further comprising the step of generating and placing additional voucher signals from the first node onto the transmission means prior to the receipt of the ticket signal in the first node if the first storage means receives additional outgoing information from the first system component.

* * * * *